United States Patent
Yacovone

(10) Patent No.: US 9,574,028 B2
(45) Date of Patent: Feb. 21, 2017

(54) EMBOSSED POLYMER SHEET

(71) Applicant: Solutia Inc., St. Louis, MO (US)

(72) Inventor: Vincent J. Yacovone, Springfield, MA (US)

(73) Assignee: Solutia Inc., St. Louis, MO (US)

( * ) Notice: Subject to any disclaimer, the term of this patent is extended or adjusted under 35 U.S.C. 154(b) by 136 days.

(21) Appl. No.: 14/219,489

(22) Filed: Mar. 19, 2014

(65) Prior Publication Data
US 2014/0302281 A1    Oct. 9, 2014

Related U.S. Application Data

(60) Provisional application No. 61/810,255, filed on Apr. 9, 2013.

(51) Int. Cl.
| C08F 116/06 | (2006.01) |
| B32B 17/10 | (2006.01) |
| C08J 5/18 | (2006.01) |

(52) U.S. Cl.
CPC ....... C08F 116/06 (2013.01); B32B 17/10577 (2013.01); B32B 17/10587 (2013.01); B32B 17/10596 (2013.01); B32B 17/10761 (2013.01); C08J 5/18 (2013.01); *C08J 2329/00* (2013.01); *Y10T 428/24355* (2015.01)

(58) Field of Classification Search
CPC .............. C08F 116/06; B32B 17/10577; B32B 17/10587; B32B 17/10761; B32B 17/10596; B32B 3/00; B32B 3/26; B32B 3/30; B32B 2307/538; Y10T 428/24355
See application file for complete search history.

(56) References Cited

U.S. PATENT DOCUMENTS

| 4,452,840 A | 6/1984 | Sato et al. |
| 4,925,725 A * | 5/1990 | Endo ............... B29C 59/022 |
| | | 428/156 |

(Continued)

FOREIGN PATENT DOCUMENTS

| AU | 779525 B2 | 5/2001 |
| EP | 0185863 A1 | 5/1989 |

(Continued)

OTHER PUBLICATIONS

Notification of transmittal of the International Search Report and the written opinion of the International Searching Authority or the declaration date of mailing Jul. 22, 2014, received in International Application No. PCT/US2014/032608, Filing Date: Apr. 2, 2014.

(Continued)

*Primary Examiner* — Nancy Johnson
(74) *Attorney, Agent, or Firm* — Michelle Bugbee

(57) ABSTRACT

A high frequency semi-isotropic embossed polymer interlayer sheet is disclosed. The embossed polymer interlayer sheet has a first side; a second side opposing the first side; and an embossed surface on at least one of the sides, and a surface texture ratio, Str, (as measured per ISO 25178) of between 0.1 and 0.99. The embossed polymer sheet may have at least 50 roughness peaks per centimeter (R PC, as measured per ASME B46.1 [1985]). The embossed polymer sheet may have a mottle value of less than or equal to 2.5 (as measured by a Clear Mottle Analyzer [CMA]). The embossed polymer sheet may be polyvinyl butyral.

18 Claims, 10 Drawing Sheets

Disclosed Interlayer A1

(56) References Cited

U.S. PATENT DOCUMENTS

| | | | |
|---|---|---|---|
| 5,425,977 A | 6/1995 | Hopfe | |
| 5,972,280 A | 10/1999 | Hoagland et al. | |
| 6,800,355 B2 * | 10/2004 | Wong | B32B 17/10018 156/102 |
| 7,883,761 B2 | 2/2011 | Bourcier et al. | |
| 8,529,813 B2 | 9/2013 | Bourcier et al. | |
| 2003/0012964 A1 | 1/2003 | Choi et al. | |
| 2004/0191482 A1 | 9/2004 | Nakajima et al. | |
| 2005/0287341 A1 | 12/2005 | Nakajima et al. | |
| 2006/0188695 A1 * | 8/2006 | Yacovone | B32B 17/10 428/141 |
| 2007/0042160 A1 | 2/2007 | Nakajima et al. | |
| 2007/0231544 A1 | 10/2007 | Stenzel | |
| 2008/0254302 A1 | 10/2008 | Bourcier et al. | |
| 2008/0268204 A1 | 10/2008 | Bourcier et al. | |
| 2008/0286530 A1 | 11/2008 | Smith | |
| 2009/0324889 A1 | 12/2009 | Stenzel | |
| 2010/0028600 A1 * | 2/2010 | Kojima | B29C 55/026 428/141 |
| 2012/0135191 A1 | 5/2012 | Spangler et al. | |
| 2013/0312898 A1 | 11/2013 | Bourcier et al. | |
| 2014/0017476 A1 | 1/2014 | Bourcier et al. | |
| 2014/0346705 A1 | 11/2014 | Spangler et al. | |

FOREIGN PATENT DOCUMENTS

| | | |
|---|---|---|
| EP | 0525403 A1 | 2/1993 |
| WO | WO 2005005123 A1 | 1/2005 |

OTHER PUBLICATIONS

Blateyron, Francois, "New 3D Parameters and Filtration Techniques for Surface Metrology", pp. 1-7, 2006.

* cited by examiner

Conventional Interlayer B1

Disclosed Interlayer A1

Conventional Interlayer B2

Conventional Interlayer B3

Comparative Interlayer C1

Comparative Interlayer C2

Conventional Interlayer B3

Conventional Interlayer B1

Conventional Interlayer B2

Disclosed Interlayer A1

EMBOSSED POLYMER SHEET

CROSS REFERENCE TO RELATED APPLICATION(S)

This application claims the benefit of U.S. Provisional Patent Application Ser. No. 61/810,255, filed Apr. 9, 2013, the entire disclosure of which is incorporated by reference herein.

BACKGROUND OF THE INVENTION

1. Field of the Invention

This disclosure is related to the field of polymer interlayers for multiple layer glass panels and multiple layer glass panels having at least one embossed polymer interlayer sheet. Specifically, this disclosure is related to the field of embossed polymer interlayer sheets of multiple layer glass panels and methods of embossing the polymer interlayer sheets.

2. Description of Related Art

Generally, multiple layer glass panels are comprised of two sheets of glass, or other applicable substrates, with a polymer interlayer sheet or sheets sandwiched there between. The following offers a simplified description of the manner in which multiple layer glass panels are generally produced. First, at least one polymer interlayer sheet is placed between two substrates to create an assembly. It is not uncommon for multiple polymer interlayer sheets to be placed within the two substrates creating a multiple layer glass panel with multiple polymer interlayers. Then, air is removed from the assembly by an applicable process or method known to one of skill in the art; e.g., through nip rollers, vacuum bag or another de-airing mechanism. Following the removal of the air from the assembly, the constituent parts of the assembly are preliminarily press-bonded together by a method known to one of ordinary skill in the art. In a last step, in order to form a final unitary structure, this preliminary bonding is rendered more permanent by a lamination process known to one of ordinary skill in the art such as, but not limited to, autoclaving. Amongst other applications, the resultant laminate glass panels from this process are utilized in architectural windows and in the windows of motor vehicles and airplanes.

Generally, there are a number of possible problems encountered in the art of manufacturing multiple layer glass panels. Two (2) common problems are: de-gassing and optical quality.

De-gassing (also referred to as de-airing) is the removal of the presence of gas or air in a multiple layer glass panel. Gas trapped in a multiple layer glass panel can have a negative or degenerative effect on the optical clarity and adhesion of the panel. During the manufacturing process of laminated multiple layer glass panel constructs, gases can become trapped in the interstitial spaces between the substrates and the one or more polymer interlayers. Generally, this trapped air is removed in the glazing or panel manufacturing process by vacuum de-airing the construct, nipping the assembly between a pair of rollers (also referred to as nip roll de-airing) or by some other method known to those of skill in the art. However, these technologies are not always effective in removing all of the air trapped in the interstitial spaces between the substrates, especially when the polymer interlayer sheet has a smooth surface.

Lamination of a multiple layer glass panel is a multi-step process in which the polymer interlayer sheet(s) and rigid substrates are converted to a combined final form (the multiple layer glass panel or glazing) having desirable performance and optical clarity characteristics. Nip roll de-airing is one technique that is used to evacuate air from the rigid substrate/polymer interlayer/rigid substrate construction prior to the final step in the lamination process of autoclaving. It frequently can be employed to improve autoclave yields in commercial operations. In one embodiment, samples are moved along a conveyor in an oven or several ovens and then forced into and through a pair of rubber rollers with a set gap. The gap is typically set slightly smaller than the thickness of the sample (i.e., the substrate/polymer/substrate construction). The nip rollers typically can range in hardness, for example, from 35 to 75 Durometer Shore A. The conveyor transporting the sample through the oven prior to where the sample is "nipped" heats up the glass. Glass temperatures of the sample can be from 30° C. to over 100° C., as desired. Lower temperatures are often referred to as a "cold" nip roll process. As used herein, when referring to a cold nip roll process, the glass temperature ranges from about 45° C. to about 60° C. (as measured by a contact thermometer or similar device attached to or aimed at the glass, such as with an infrared type thermometer). Once cooled to room temperature, the nipped sample can be evaluated for de-airing quality or uniformity. The nipped sample can then be placed in an autoclave for final finishing. After finishing, the final or finished laminate can be evaluated for mottle and other optical defects.

Generally, the presence of a gas in the interstitial spaces of a multiple layer glass panel takes the form of bubbles in the polymer interlayer sheet(s) or pockets of gas between the polymer interlayer sheet(s) and the substrates. These bubbles and gaseous pockets are undesirable and problematic where the end-product multiple layer glass panel will be used in an application where optical quality is important. Thus, the creation of a solid-phase interlayer essentially free of any gaseous pockets or bubbles is paramount in the multiple layer glass panel manufacturing process.

Not only is it important to create a multiple layer glass panel free of gaseous pockets and bubbles immediately after manufacturing, but it is also important that the glass panel remain free of gaseous pockets and bubbles over its lifetime. It is not an uncommon defect in the art of multiple layer glass panels for dissolved gases to appear (e.g., for bubbles to form) in the panel over time, especially at elevated temperatures and under certain weather conditions and sunlight exposure. Thus, it is also important that, in addition to leaving the laminate production line free from any bubbles or gaseous cavities, that the multiple layer glass panel remain gas-free for a substantial period of time under end-use conditions to fulfill its commercial role.

For the successful production of high quality automotive or architectural multiple layer glass panels, also known as safety glazings, there needs to be an assurance of high yields when combining the initial, individual, polymer sheet(s) with the preferred glass type/part through the entire glass panel manufacturing process. A key part of that process is the autoclave cycle where the multiple layer glass panel structure enters into a pre-final or "pre-press" stage and emerges as a completed entity and saleable part for installation into a vehicle or building. Ensuring the highest autoclave yield possible for the glass panel manufacturer is essential for highest profitability and success because production of multiple layer glass panels is a time-consuming batch process where significant process bottlenecking and highest losses can occur because it is difficult to recycle parts once they have been laminated.

In order to facilitate the de-airing process and to provide acceptable optical quality, particularly in the glass panel, it has become common in the art of multiple layer glass panel manufacturing to emboss one or both sides of the polymer interlayer(s), thereby creating minute raised and depressed portions on the surface of the polymer interlayer. Embossment of the polymer interlayer has been shown to be effective in enhancing the de-airing process, and it is also effective in reducing the occurrence of blocking.

While certain embossing methods and techniques in the manufacture of multiple layer glass panels are known, there are several problems with the different embossing processes previously utilized in the art (referred to herein as "Conventional Processes"). In some Conventional Processes for making polymer interlayer sheets, the polymer sheet was cooled from a polymer sheet melt to form a polymer interlayer sheet, and then the surface of the polymer interlayer sheet was reheated, before the embossing step. Practically, in some methods, this necessitated that the polymer interlayer be fed through multiple sets of rollers in additional production steps before it could be embossed. FIGS. 1 and 2 depict two different Conventional Processes each which utilize multiple cooling, reheating and embossing steps. These additional production steps could significantly add to the costs, energy intake and the overall space required for multiple layer glass panel production.

Often, if both sides of a polymer were embossed in the Conventional Processes, the embossing was generally performed in separate successive steps with separate sets of embossing rollers by running the polymer interlayer sheet between two sets of embossing rollers. Thus, embossing in some Conventional Processes was performed in multiple separate successive stages with different sets of rollers, with each side of the polymer interlayer sheet being embossed in one of the successive stages. FIG. 2 provides a diagram of such a multi-step embossing process.

This multi-stage embossing process is generally required in some Conventional Processes because of the necessity of cooling the polymer interlayer sheet from a melt prior to embossing. As noted previously, in some Conventional Processes, the polymer interlayer sheet is not embossed directly after it leaves the extrusion die while it is still a melt because the molten polymer will stick to the embossing rolls causing a mess and degrading the integrity of the polymer interlayer sheet, rendering it unusable. Accordingly, the polymer interlayer sheet is cooled prior to embossing. However, a completely cooled polymer interlayer sheet is difficult, if not impossible, to emboss, therefore, in some Conventional Processes, after the polymer melt is cooled to a polymer interlayer sheet, the surface of the interlayer sheet must be reheated with the embossing roller (or by some other technique) at the time of embossing. The surface roughness or surface pattern of the embossed polymer interlayer sheet made by this process often has lower retention of the pattern than surface roughness or surface pattern of embossed polymer interlayer sheets of some other processes.

In some Conventional Processes using two embossing steps, the heated embossing roller is combined with a non-embossing roller, such as a rubber roller, which offers greater and more consistent pressure (higher contact force) to the embossing roller system than can be achieved if two metal (e.g., steel) embossing rollers are utilized simultaneously. Thus, if both sides of the polymer interlayer sheet are to be embossed in the Conventional Processes, usually at least two sets of rollers (each set being comprised of an embossing roller and a rubber roller) are utilized.

FIG. 3 depicts another Conventional Process for embossing a polymer interlayer sheet. As shown in FIG. 3, the polymer interlayer sheet is embossed in a step right after leaving the extruder die. The polymer interlayer sheet is embossed at an elevated temperature (that is, it is embossed while it is still a melt). No cooling step is required or utilized to lower the temperature between the steps of extrusion from the extrusion die and embossing. Rather, the polymer melt sheet (as opposed to the cooled and set polymer interlayer sheet) is embossed in a single embossing stage in which the polymer melt sheet is fed from the extrusion die into a single set of two embossing rollers (which in some embodiments are made of steel) directly out of the extrusion die, and both sides of the polymer melt sheet are simultaneously embossed. One side of the polymer melt sheet is embossed by one of the embossing rollers and the other side of the polymer melt sheet is embossed by the other embossing roller.

In some Conventional Processes, the embossed polymer interlayer sheet would perform adequately in the de-airing processes, but the optical clarity or optical properties of the final multiple layer glass panel was not acceptable to laminators due to reduced optical clarity or mottle. In other Conventional Processes, the optical clarity or optical properties of the final multiple layer glass panel was acceptable to laminators, but the embossed polymer interlayer sheet would not perform adequately in the de-airing processes, and de-air uniformity was unacceptable. Finally, in some Conventional Processes, neither the de-airing performance nor the optical quality (or mottle) was adequate. Mottle refers to an objectionable visual defect that manifests itself as graininess or texture in a laminated multiple layer polymer interlayer. Mottle and de-air uniformity will be further described below.

Multiple layer glass panels or laminated safety glazings need to have high optical quality and be free of defects as they are used in many demanding visual applications. It has been found that the quality of the pre-press laminate (the rigid substrate/polymer/rigid substrate construction or the glass/polymer sheet(s)/glass sandwich construction) after initial de-airing, such as cold nip roll de-airing, prior to final lamination is an excellent predictor of how well the panels will behave in the autoclave (that is, how good the final laminate quality will be) and therefore how good or bad the autoclave yield will be, therefore, the pre-press laminates should have certain qualities such as minimum entrapped air, a uniform de-airing appearance and minimization of air pockets or surface texture prior to autoclave finishing steps.

Summarized, the previous embossed polymer interlayer sheets, when laminated in a multiple layer glass panel, did not always provide the combination or balance of desired optical clarity (such as mottle) and optimum de-airing properties (such as de-air uniformity in the cold nip roll process). Stated differently, previous embossed polymer interlayer sheets, as well as some non-embossed polymer interlayer sheets, did not always provide the desired balance of properties, including at least good or acceptable de-airing and good or acceptable optical clarity, while not adversely affecting other properties of either the embossed polymer interlayer sheet or the multiple layer glass panel. This embossed polymer sheets of the invention specifically provide an embossed polymer sheet that has good de-air uniformity in the cold nip roll process and low, commercially acceptable mottle.

SUMMARY OF THE INVENTION

Because of these and other problems in the art, described herein, among other things is an embossed polymer interlayer sheet comprising: a first side; a second side opposing the first side; and an embossed surface on at least one of the sides, wherein the embossed polymer interlayer sheet has a high frequency semi-isotropic surface having a surface texture ratio, Str, (as measured per ISO 25178) of between 0.1 and 0.99. In some embodiments, the Str may be between 0.2 and 0.99, or the Str may be between 0.2 and 0.8, or the Str may be greater than 0.5, or the Str may be between 0.5 and 0.99, or the Str may be between 0.7 and 0.99.

In certain embodiments, the embossed polymer interlayer sheet will also have greater than 25 roughness peaks per centimeter (R PC, as measured per ASME B46.1 [1985]), or at least 30 R PC, or at least 35 R PC, or at least 40 R PC, or at least 45 R PC, or at least 50 R PC, or at least 55 R PC, or at least 60 R PC, or at least 65 R PC, or at least 70 R PC, or at least 75 R PC, or at least 80 R PC, or at least 85 R PC, or at least 90 R PC, or at least 95 R PC, or at least 100 R PC. In an embodiment, the embossed polymer interlayer surface has an R PC (according to ASME B46.1 [1985]) that is greater than 25, or greater than 50, or greater than 85, or greater than 100.

In some embodiments, the embossed polymer interlayer sheet has a peak height distribution kurtosis, Sku, of greater than 3.0 (as measured per ISO 25178).

The embossed polymer interlayer sheet can be comprised of a thermoplastic resin chosen from the group consisting of: polyvinyl butyral, polyurethane, poly(ethylene-co-vinyl acetate), poly(vinyl)acetal, polyvinylchloride, polyethylenes, polyolefins, ethylene acrylate ester copolymers, poly(ethylene-co-butyl acrylate), polyethylene-acrylic acid and partially neutralized salts, polyethylene-methacrylic acid and partially neutralized salts, polycarbonate, polypropylene, and silicone elastomers. It certain embodiments, the embossed polymer interlayer sheet will further comprise one or more additives chosen from the group consisting of: plasticizers, dyes, pigments, stabilizers, antioxidants, anti-blocking agents, flame retardants, IR absorbers, processing aides, flow enhancing additives, lubricants, impact modifiers, nucleating agents, thermal stabilizers, UV absorbers, UV stabilizers, dispersants, surfactants, chelating agents, coupling agents, adhesives, primers, reinforcement additives, and fillers.

The embossed polymer interlayer sheet can be a single, monolithic polymer sheet, or it can be comprised of multiple polymer layers between said first side and said second side, creating an embossed multi-layer polymer interlayer. In one embodiment, this embossed multi-layer polymer interlayer sheet will have a mottle value of less than or equal to 2.5 as measured by CMA. In another embodiment, this embossed multi-layer polymer interlayer sheet will have a mottle value of less than or equal to 1.5 as measured by CMA. The mottle may also be less than 1.5, or less than or equal to 1, as measured by CMA. In an embodiment, the polymer interlayer sheet may be a monolithic sheet. The monolithic sheet may be used alone in a multiple layer glass panel, or it may be used in combination with other monolithic or multi-layer polymer sheets of the same or different materials. The embossed polymer interlayer sheet may be a clear (that is no pigment, dye or colorant) sheet or it may be a colored or pigmented sheet. If the sheet is a multi-layer polymer sheet, the color or pigment or dye may be in any or all of the layers. For example, for a multi-layer polymer sheet such as a tri-layer sheet, the color or pigment may be in the core layer(s), in one or more of the skin layers, or in the core and skin layers. Embossed polymer interlayer sheets of the invention that are monolithic will provide a good balance of de-airing properties in combination with improved optical properties, particularly when used in conjunction with other layers or with colors.

Also disclosed herein is an embossed polymer interlayer sheet with a surface roughness, Rz, of 10 to 90 microns, and surface roughness, Sz, of from about 1 to 85 microns, or from about 2 to about 80 microns, or from about 5 to about 50 microns, or from about 10 to about 30 microns. In one embodiment, the embossed polymer interlayer has a texture aspect ratio, Str, of greater than 0.1. In another embodiment, the embossed polymer interlayer has a texture aspect ratio, Str, of less than 0.99. In another embodiment, the embossed polymer interlayer has a texture aspect ratio, Str, of between 0.1 and 0.99. In another embodiment, the embossed polymer interlayer has a texture aspect ratio, Str, of between 0.1 and 0.7. The Str can be greater than or equal to 0.5 in some embodiments, from 0.5 to 0.99, from 0.1 to 0.5, from 0.7 to 0.99, or any value between 0.1 and 0.99.

In another embodiment, the embossed polymer interlayer sheet has a mottle value of less than or equal to 2.5, or less than or equal to 2.0, or less than or equal to 1.5, or less than or equal to 1.0 (as measured by a Clear Mottle Analyzer [CMA]).

In another embodiment, the embossed polymer interlayer sheet has a surface roughness, Sz, of from about 5 to about 50 microns, or from about 10 to about 30 microns.

A method for generating an embossed polymer interlayer sheet is also disclosed. This method comprises the steps of: extruding a polymer melt sheet; after the extruding, embossing the polymer melt sheet in a single embossing stage and after the embossing, cooling the polymer melt sheet to form a polymer interlayer sheet, wherein, after the cooling, the polymer interlayer sheet retains substantially all of the embossing applied to the polymer melt sheet, and wherein the polymer interlayer sheet has a high frequency semi-isotropic surface having a surface texture ratio, Str, (as measured per ISO 25178) of between 0.1 and 0.99.

In an embodiment, both sides of the polymer melt sheet can be embossed simultaneously in a single embossing stage with a set of embossing rollers. In another embodiment, the sides of the polymer melt sheet may be embossed separately.

Also disclosed herein is an apparatus for embossing a polymer melt sheet, the apparatus comprising: an extrusion device for extruding a polymer melt sheet; a set of embossing rollers; and a cooling device for cooling the polymer melt sheet into a polymer interlayer sheet; wherein after being extruded from the extrusion device, the polymer melt sheet is fed through the set of embossing rollers prior to being cooled by the cooling device, and wherein the embossing rollers each have a surface pattern having blasted voids in the surface of the roller in a manner that provides for a random embossed pattern on a polymer interlayer sheet.

DESCRIPTION OF THE PREFERRED EMBODIMENT(S)

Described herein, among other things, is an embossed polymer interlayer sheet for use in a multiple layer glass panel having an improved balance of properties, including a combination of improved de-airing (good de-airing uniformity in a cold nip roll process) and optical quality characteristics and performance. The embossed polymer interlayer sheet has a high frequency, semi-isotropic surface that is a random surface pattern.

As an initial matter, it is contemplated that polymer interlayer sheets as described herein may be produced by any suitable process known to one of ordinary skill in the art of producing polymer interlayer sheets that are capable of being embossed. For example, it is contemplated that the polymer interlayer sheets may be formed through dipcoating, solution casting, compression molding, injection molding, melt extrusion, melt blowing or any other procedures for the production and manufacturing of a polymer interlayer sheet known to those of ordinary skill in the art. Further, in embodiments where multiple polymer interlayers are utilized, it is contemplated that these multiple polymer interlayers may be formed through coextrusion, blown film, dip coating, solution coating, blade, paddle, air-knife, printing, powder coating, spraying or other processes known to those of ordinary skill in the art. While all methods for the production of polymer interlayer sheets known to one of ordinary skill in the art are contemplated as possible methods for producing the polymer interlayer sheets embossed in the methods described herein, this application will focus on polymer interlayer sheets produced through the extrusion and coextrusion processes.

Figure 1:
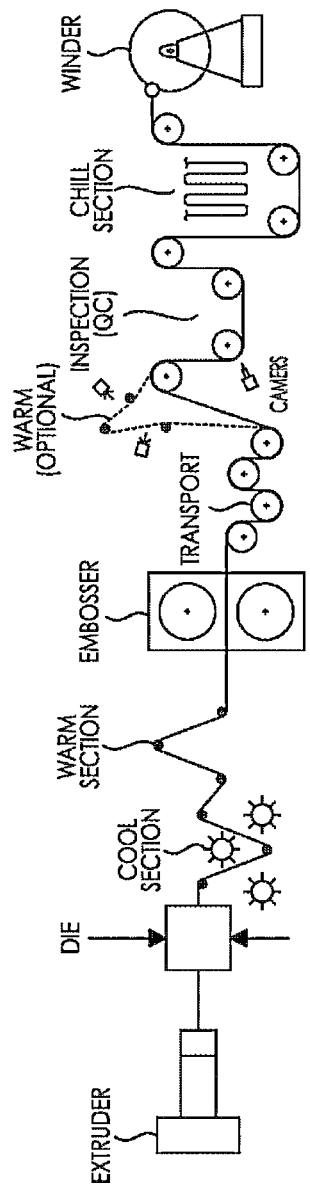
FIG. 1 provides a diagram of an embodiment of a conventional extrusion and embossing process for polymer interlayer sheets.
Figure 2:
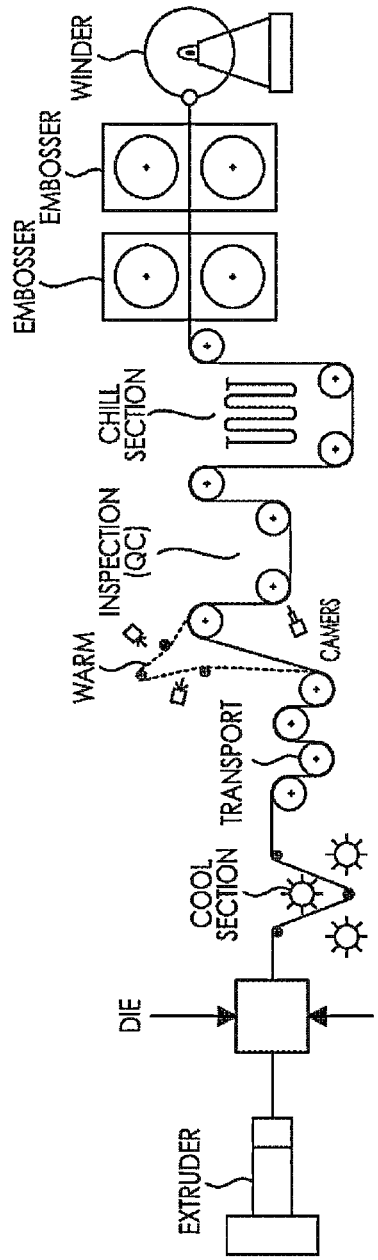
FIG. 2 provides a diagram of an embodiment of a conventional extrusion and embossing process for polymer interlayer sheets.
Figure 3:
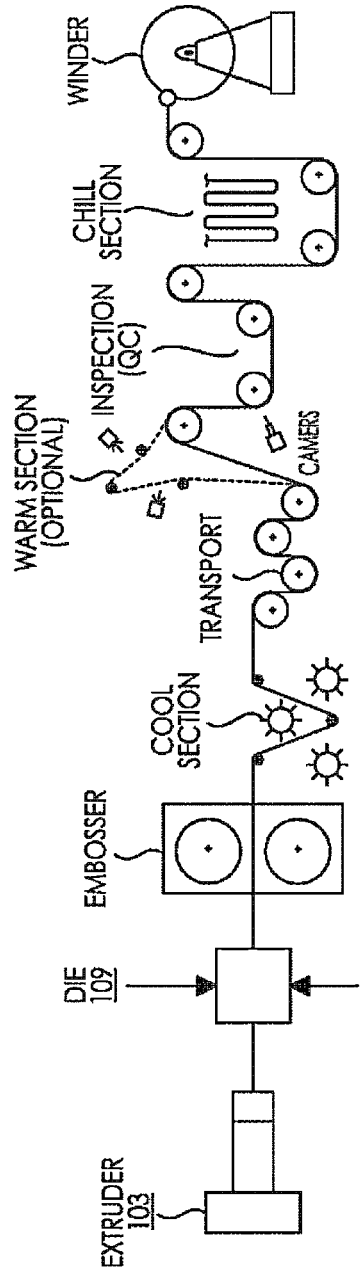
FIG. 3 provides a diagram of an embodiment of an extrusion process and embossing process for polymer interlayer sheets.

In order to facilitate a more comprehensive understanding of the embossing methods disclosed herein, this application summarizes the extrusion process by which, in certain embodiments, it is contemplated that the polymer melt sheet to be embossed will be formed. FIGS. 1 to 3 depict general graphical representations of different conventional polymer extrusion processes. Generally, in its most basic sense, extrusion is a process used to create objects of a fixed cross-sectional profile. This is accomplished by pushing or drawing a material through a die of the desired cross-section for the end product.

Referring to FIG. 3, generally, in the extrusion process, thermoplastic raw material is fed into an extruder device (103). Examples of the thermoplastic resins used to form polymer interlayers in accordance with this invention include, but are not limited to, polyvinyl butyral (PVB), polyurethane (PU), poly(ethylene-co-vinyl acetate) (EVA), poly(vinyl)acetal (PVA), polyvinylchloride (PVC), polyethylenes, polyolefins, ethylene acrylate ester copolymers, poly (ethylene-co-butyl acrylate), polyethylene-acrylic acid and partially neutralized salts, polyethylene-methacrylic acid and partially neutralized salts, polycarbonate, polypropylene, silicone elastomers, epoxy resins and any acid copolymers and ionomers derived from any of the foregoing possible thermoplastic resins.

Additives such as colorants and UV inhibitors (in liquid or pellet form) are often used and can be mixed into the thermoplastic resin prior to arriving in the extruder device (103). These additives are incorporated into the thermoplastic polymer resin, and by extension the resultant polymer interlayer sheet, to enhance certain properties of the polymer interlayer sheet and its performance in the final multiple layer glass panel product. Contemplated additives include, but are not limited to, plasticizers, dyes, pigments, stabilizers, antioxidants, anti-blocking agents, flame retardants, IR absorbers, processing aides, flow enhancing additives, lubricants, impact modifiers, nucleating agents, thermal stabilizers, UV absorbers, UV stabilizers, dispersants, surfactants, chelating agents, coupling agents, adhesives, primers, reinforcement additives, and fillers, among other additives known to those of skill in the art.

In the extruder device (103), the particles of the thermoplastic raw material are melted and mixed, resulting in a molten thermoplastic resin that is generally uniform in temperature and composition. Once the molten thermoplastic raw material reaches the end of the extruder device (103) the molten thermoplastic resin is forced into the extruder die (109). The extruder die (109) is the component of the thermoplastic extrusion process which gives the final polymer interlayer sheet product its profile. Generally, the die (109) is designed such that the molten thermoplastic resin evenly flows from a cylindrical profile coming out of the die (109) and into the product's end profile shape. A plurality of shapes can be imparted to the end polymer interlayer sheet by the die (109) so long as a continuous profile is present.

For the purposes of this application, the polymer interlayer at the state after the extrusion die (109) forms the thermoplastic resin into a continuous profile will be referred to as a "polymer melt sheet." At this stage in the process, the extrusion die (109) has imparted a particular profile shape to the thermoplastic resin, thus creating the polymer melt sheet. The polymer melt sheet retains this shape, but is still comprised of molten thermoplastic resin at raised temperatures. The polymer melt sheet is highly viscous throughout and in a generally molten state. In the polymer melt sheet, the thermoplastic resin has not yet been cooled to a temperature at which the sheet generally completely "sets." Thus, after the polymer melt sheet leaves the extrusion die (109), the next step in some of the conventional processes (as seen in FIG. 1 and FIG. 2) is to cool the polymer melt sheet with a cooling device. Cooling devices utilized in the previously employed processes include, but are not limited to, spray jets, fans, cooling baths, and cooling rollers. The cooling step functions to set the polymer melt sheet into a polymer interlayer sheet of a generally uniform non-molten cooled temperature. In contrast to the polymer melt sheet, this polymer interlayer sheet is not in a molten state. Rather, it is the set final-form cooled polymer interlayer sheet product. For the purposes of this application, this set and cooled polymer interlayer will be referred to as the "polymer interlayer sheet." Generally, the thickness, or gauge, of the polymer interlayer sheet will be in a range from about 0.1 to about 3.0 millimeters. If using process as shown in FIG. 3 where the polymer melt sheet is not cooled, the polymer melt sheet is instead embossed almost immediately after extrusion, as previously described and as described further below.

In some embodiments of the extrusion process, a coextrusion process may be utilized. Coextrusion is a process by which multiple layers of polymer material are extruded simultaneously. Generally, this type of extrusion utilizes two or more extruders to melt and deliver a steady volume throughput of different thermoplastic melts of different viscosities or other properties through a single extrusion die into the desired final form. The thickness of the multiple polymer layers leaving the extrusion die in the coextrusion process can generally be controlled by adjustment of the relative mass or volume of the melt through the extrusion die and by the sizes of the individual extruders processing each molten thermoplastic resin material.

The terms "polymer melt sheet" or "polymer interlayer sheet" as used herein, may designate a single-layer sheet or a multi-layer sheet. A multi-layer sheet may comprise multiple separately extruded layers or may comprise multiple co-extruded layers (or a combination of both separately extruded and co-extruded layers). Any multi-layer sheet utilized can be varied by manipulating the composition, thickness, or positioning of the layers and the like. For example, in one tri-layer polymer sheet, the two surface (or skin) layers may comprise one of the thermoplastic materials described above to enhance the adhesion, optical clarity, anti-block or physical properties of the sheet, while the middle (or core) layer(s) may comprise a different thermoplastic material or the same thermoplastic material having different additives or amounts of additives and different properties, and this combination may provide optical clarity, structural support, shock absorbance or simply a more cost effective end-product. It is contemplated that the surface layers and the middle layer(s) of the multi-layer sheets may be comprised of the same thermoplastic material or different thermoplastic materials. It is also contemplated that the polymer interlayer sheet may be pigmented, dyed or colored, and the pigment, dye or colorant may be dispersed throughout the entire polymer interlayer sheet, only on a portion of the polymer interlayer sheet (such as, for example, a gradient band), in one or more layers of a multi-layer polymer interlayer sheet, or in a portion of one or more layers of a multi-layer polymer interlayer sheet.

In order to understand the embossing process of the present disclosure, it is also important to have an understanding of the surface patterns and roughness imparted to a polymer interlayer sheet by embossing, along with the scales, mechanisms and formulas by which the roughness and pattern of the surface of a polymer interlayer sheet are characterized. Generally, the end-product polymer interlayer sheets disclosed herein will have at least one embossed surface. An "embossed surface," as that term is used herein, is a surface upon which a certain design has been imprinted with a tool engraved or otherwise formed with a pattern (such as an embossing roller). The pattern imprinted on the surface of the polymer interlayer is generally the negative of the pattern engraved or formed on the tool. The embossed surface pattern of the polymer interlayer generally comprises projections (or peaks) upward from an imaginary plane of the flattened polymer interlayer, as well as voids, or depressions (or valleys), downward from the imaginary plane in a way that the projections and depressions are of similar or the same volume, generally located in close proximity to each other. The projections or peaks and depressions or valleys may be of the same or different volume and height. The projections and depressions on the embossed surface are the opposite of (or formed by) the depressions and projections on the embossing roller.

For a typical surface pattern, the surface roughness, or the height of particular peaks on the roughened surface from the imaginary plane of the flattened polymer interlayer sheet, is the Rz value of the surface. The two-dimensional surface roughness, or Rz, of the surface of a polymer interlayer sheet when described in this application will be expressed in microns (μm) as measured by a 10-point average roughness in accordance with DIN ES ISO-4287 of the International Organization for Standardization and ASME B46.1 of the American Society of Mechanical Engineers. In general, under these scales, Rz is calculated as the arithmetic mean value of the single roughness depths Rzi (i.e., the vertical distance between the highest peak and the deepest valley within a sampling length) of consecutive sampling lengths (or traces of the surface):

$$Rz = \frac{1}{N} \times (R_{z1} + R_{z2} + \ldots + R_{zn}).$$

Figure 6:
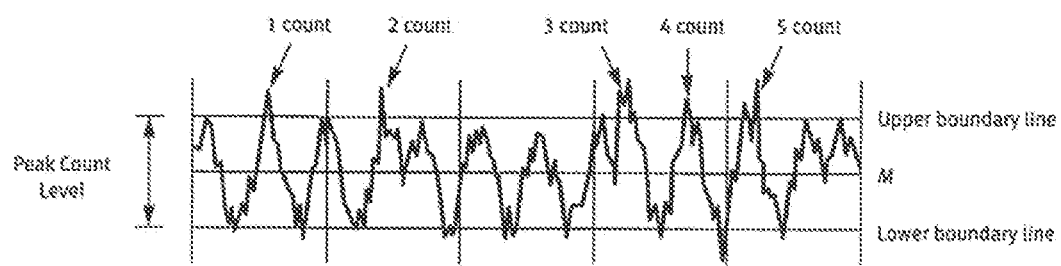
FIG. 6 provides a chart showing how the Roughness Peak Count (R PC) of the surface of a sample is measured or counted.

In general, Rz is not limited to measurements for embossed surfaces of polymer interlayer sheets. Rz can be utilized to measure the surface typography of both embossed and non-embossed polymer interlayer sheets (non-embossed polymer interlayer sheets are also referred to as random rough sheets). It should be noted that while Rz is one of many values or measurements traditionally utilized to describe the surface of a polymer interlayer sheets, Rz values alone do not characterize the complete profile of the surface. Rz values are considered two-dimensional measures used to describe the surface of the polymer interlayer sheets. Another parameter used to describe the polymer interlayer sheet surface is roughness peak count (R PC), which is a two dimensional surface measurement parameter that was measured by a Mahr Perthometer S3P device according to the standards SEP 1940:01.92 and ANSI/ASME B46.1 (1985). For the measurements, the following set points on the device were used: Profile (R): Roughness; Filter (GS): Gaussian Standard; Trace Length (LT): 17.5 mm; Measuring Length (LM): 12.5 mm; Sampling Length (LC): 2.5 mm; Lower Boundary (C2): −0.5 μm from mean line (M); and Upper Boundary (C1): 0.5 μm from mean line (M). The peak count is dependent on the profile type, and an upper and lower boundary (C1 and C2). The peak count is the number or counts of roughness profile elements exceeding the lower boundary line (C2), and the upper boundary line (C1), immediately afterwards as shown in the FIG. 6. As used herein, a surface having at least 25 roughness peaks (R PC of at least 25) is referred to as a "high frequency" surface. In some embodiments, the surface will have an R PC value (roughness peaks) of at least 300, or at least 35, 40, 45, 50, 55, 60, 65, 70, 75, 80, 85, 90, 95 or at least 100.

A better way to more fully characterize the surface and topography of a polymer interlayer sheet is the use of three-dimensional surface parameters to describe the surface topography. The three-dimensional surface standards and definitions are found in ISO 25178 (Parts 601 and 701, which detail using a contact profilometer and a diamond point to measure the surface with the aid of a lateral scanning device), and they are usually assigned the prefix "S" (whereas parameters commonly found in two-dimensional nomenclature are often assigned a prefix "R"). The three-dimensional parameters discussed herein were measured using a Mahr RFHTB-250 and an MDW-250 stylus with PRK and PGK 120 drive units and a Mahr XY traverse table, and calculated using MountainsMap® software (version 3.2.0 by Digital Surf, Besancon, France). A Mahr S8P profilometer was used to export the data files to the MountainsMap® software. Many of the mathematical expressions for the two-dimensional parameters or descriptions can be extended to three-dimensional surface measurement. One exception is the surface roughness, Sz. While Rz is defined (in ISO 4287) as the maximum height over a base length and is averaged on the number of base lengths used (for example, ten samples, as previously discussed), Sz is a measure of the maximum height form the highest point to the deepest valley. Sz and Rz are similar parameters to the extent that they both look at the peak to valley height of the surface. Ssk is a measure of the skewness (or symmetry) of the distribution of peaks of the surface of the polymer interlayer sheet, and Sku is a measure of the spread of the height distribution of the surface of the polymer interlayer sheet. The parameters Ssk and Sku can be used to describe both two-dimensional and three-dimensional surfaces.

Surface texture ratio, Str, is a three-dimensional spatial parameter that is only used to describe three-dimensional surfaces. Str is a measure of the texture aspect ratio of the surface of the polymer interlayer sheet. The texture aspect ratio of the surface of the polymer interlayer sheet is important because it is an indicator of the surface isotropy. The Str parameter values range between 0 and 1 without a unit. A Str value of 0 or close to 0 represents a strongly anisotropic surface and reflects a very regular pattern and a Str value of 1 or close to 1 represents an isotropic surface and reflects a very random pattern. A surface is isotropic when it presents identical characteristics regardless of the measurement of direction. For a random surface texture or pattern, no texture or pattern stands out. Conversely, an anisotropic surface has patterns or oriented surfaces that may be described as regular surface patterns. For additional information about the three-dimensional parameters, see, for example, "New 3D Parameters and Filtration Techniques for Surface Metrology", Francois Blateyron, 2006, the entire disclosure of which is incorporated herein.

Figure 4A:
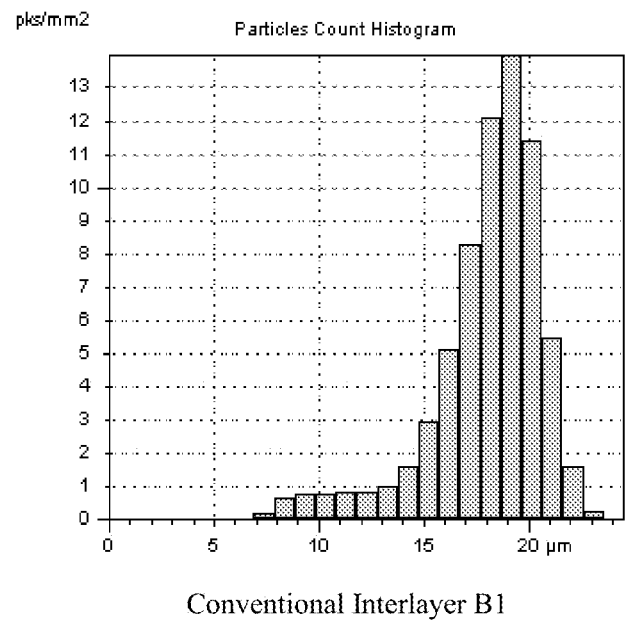
FIG. 4A to 4F provide surface peak distribution profiles of Conventional Interlayers, Comparative Interlayers and the Disclosed Interlayer.
Figure 4B:
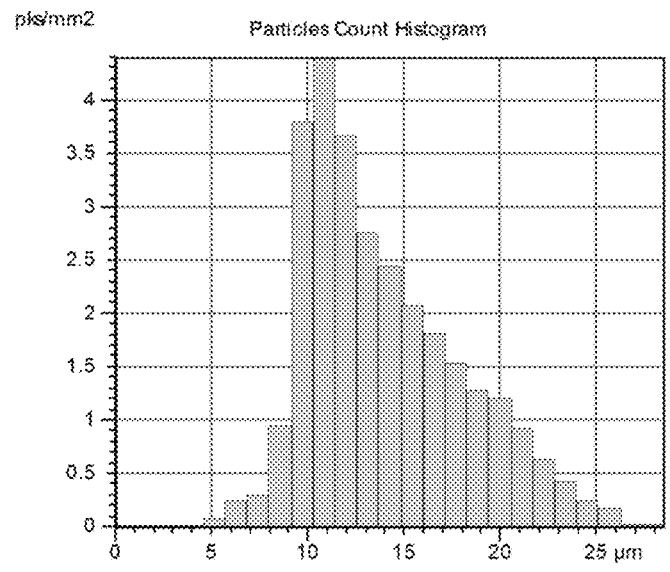
Figure 4C:
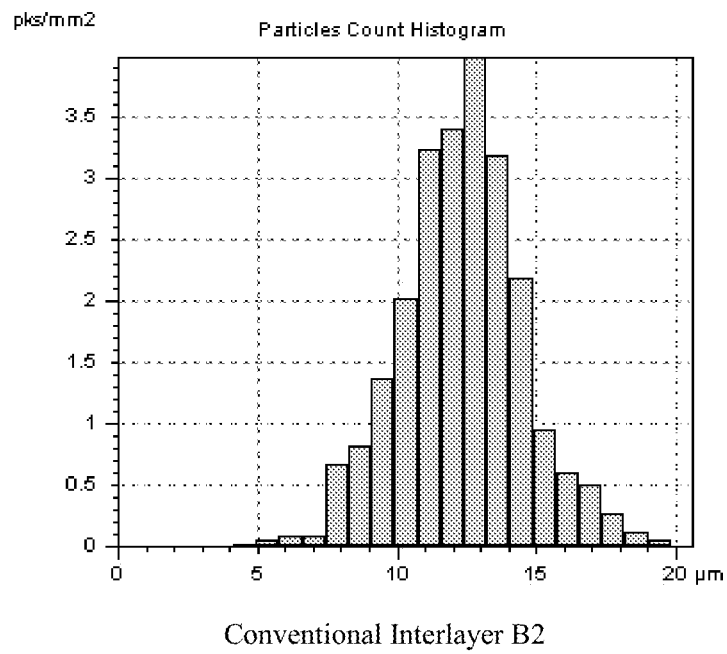
Figure 4D:
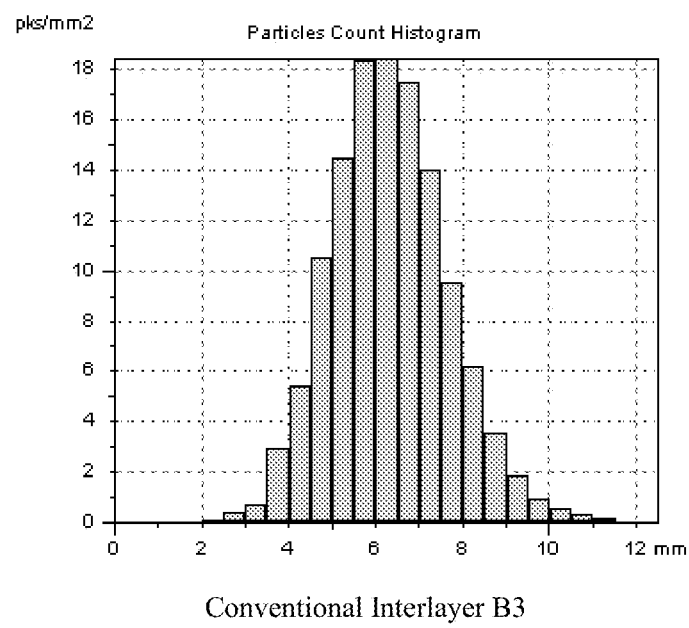
Figure 4E:
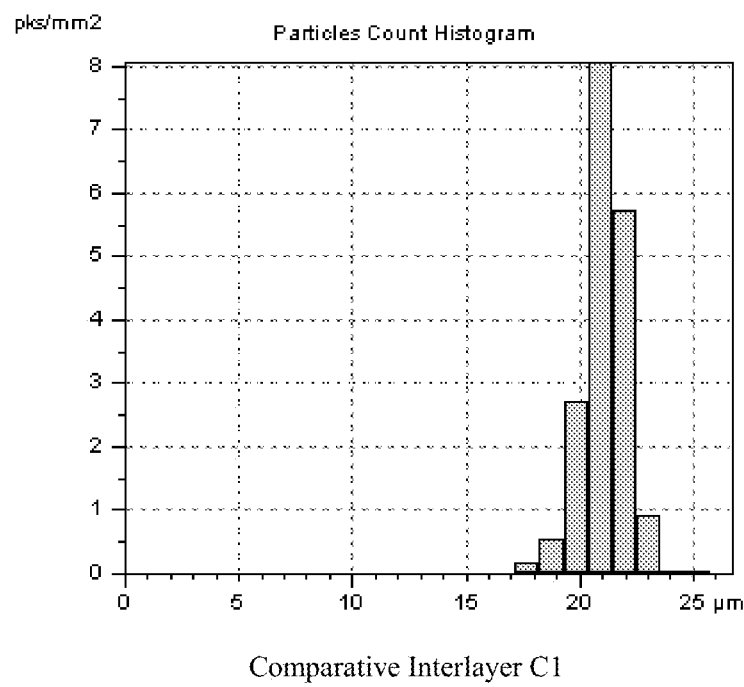
Figure 4F:
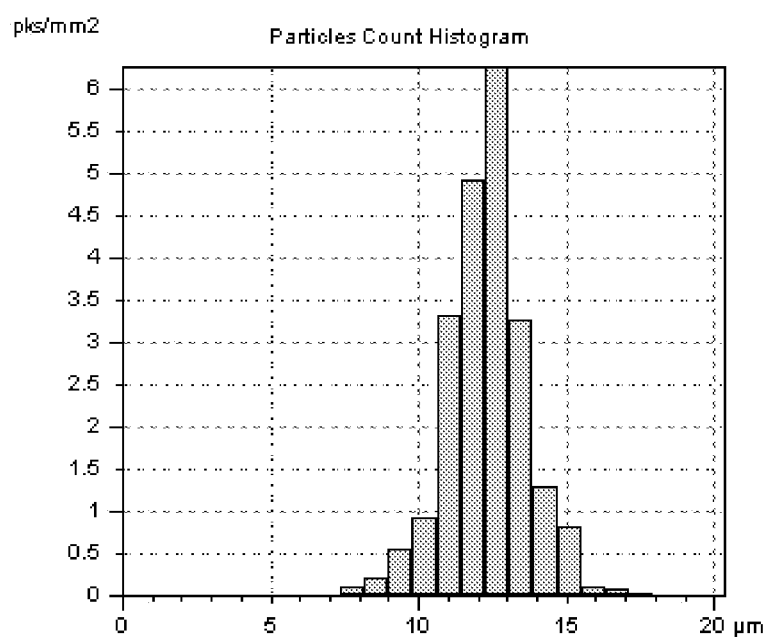

FIGS. 4A to 4F graphically show the surface peak distribution profiles for different samples, including both regular and random surfaces. FIG. 4A, FIG. 4C and FIG. 4D each show the surface peak distribution profile for different conventional interlayers (Conventional Interlayers B1, B2 and B3 respectively, from Example 1). FIG. 4B shows the surface peak distribution profile for the disclosed interlayer (Disclosed Interlayer A1 from Example 1). FIG. 4E and FIG. 4F show Comparative Interlayers A2 and A3.

Figure 7A:
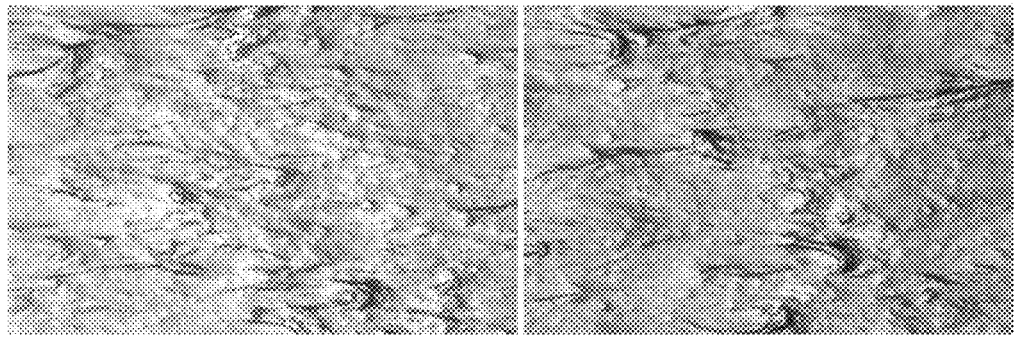
FIG. 7A to 7D provide magnified pictures of the surface of the polymer interlayer sheet of Conventional Interlayers and the Disclosed Interlayer.
Figure 7B:
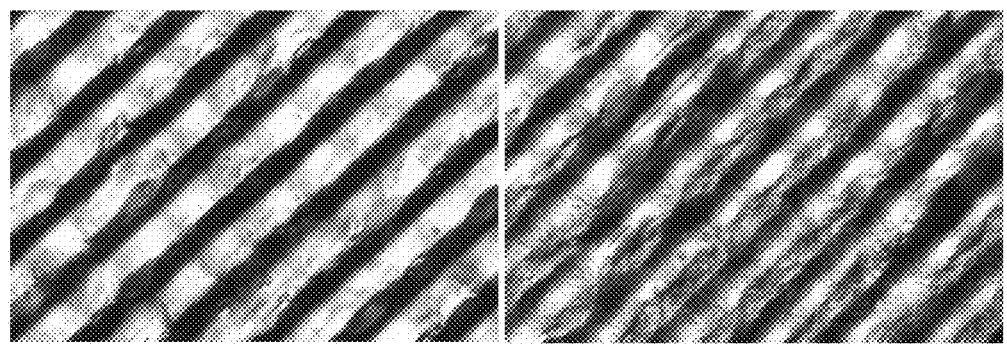
Figure 7C:
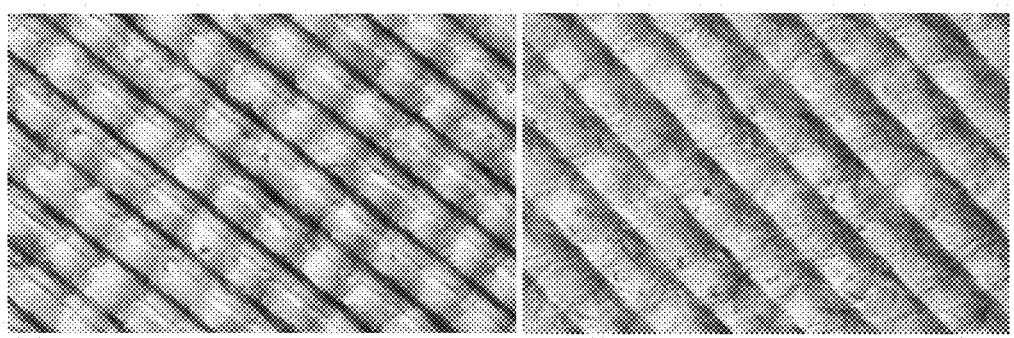
Figure 7D:
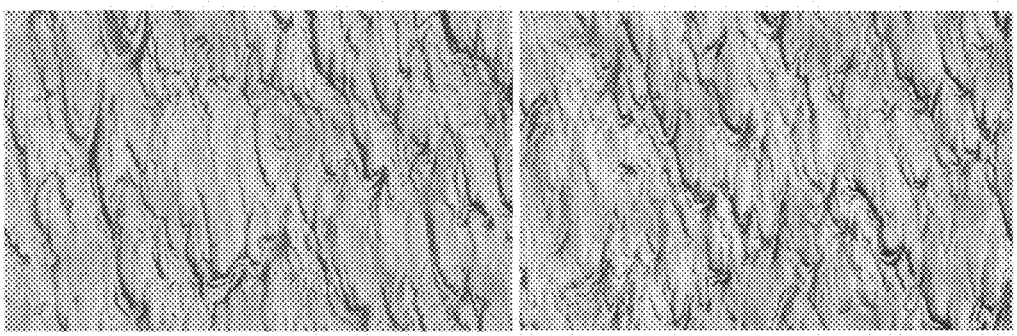

FIGS. 7A to 7D are magnified pictures of the surface of the polymer interlayer sheets. FIG. 7A shows two pictures of the surface of Conventional Interlayer B3, which is a non-embossed random surface. FIG. 7B shows two pictures of the surface of Conventional Interlayer B1, which is an embossed, regular surface. FIG. 7C shows two pictures of the surface of Conventional Interlayer B2, which is an example of a different embossed, regular surface. Finally, FIG. 7D shows two pictures of the surface of Disclosed Interlayer A1, which is an embossed, random surface. FIGS. 7A to 7D clearly show the difference pictorially between regular and random surfaces.

The surface of a polymer interlayer sheet (whether embossed or non-embossed) may have a pattern that is referred to as a random pattern or a regular pattern. As used herein, a regular surface or regular pattern refers to a pattern that is generally a repeatable pattern. Examples of regular patterns include, but are not limited to, parallel channels, sawtooth patterns, geometric shapes such as squares, pyramids, and the like, or combinations of patterns. A regular surface may be created by the surface of the roll, or by the pattern on the embossing roller(s). As discussed above, a regular pattern is generally an anisotropic pattern, having a value for the Str approaching 0. As used herein, a random pattern refers to a pattern that has no regular or repeating pattern throughout the surface. A random surface may be created by, for example, melt fracture as the polymer interlayer sheet is extruded and the melt exits the die, by the surface of the die roll, or by the pattern on the embossing roller(s), or by another other method or device known to one skilled in the art for creating a random surface. As discussed above, a random pattern is generally an isotropic pattern, having a value for the Str approaching 1. As used herein, a semi-isotropic means a surface pattern that is neither completely isotropic nor anisotropic and has a Str value between 0 and 1, or between 0.1 and 0.99, or even approaching 0.5.

It is contemplated that the embossed polymer interlayer sheet product of this application can be embossed on one or both sides. The embossed surface patterns and/or depth thereof can be symmetric or asymmetric with respect to the two sides of the polymer interlayer sheet; the patterns and/or depth of the two embossed surfaces on opposite sides of the polymer interlayer sheet can be the same or different. The particular surface pattern is created by preparing the embossing rollers with a random surface having certain characteristics, as described further below. The pattern of the embossing rollers may be made by any method known to one of ordinary skill in the art, such as engraving, sand blasting, grit blasting, or combinations of the various methods.

In one embodiment of the invention, the embossing roller(s) are prepared in a way such that the surface of the roller(s) will create a surface topography or surface pattern on the polymer interlayer sheet that is a random pattern. Any roller surface capable of creating the desired random pattern on the polymer interlayer sheet, along with the operating conditions, may be used. By embossing a random surface on the polymer interlayer sheet having the previously described characteristics, a multiple layer glass panel comprising the embossed polymer interlayer sheet of the invention will have a superior balance of properties, such as de-airing uniformity and performance and optical quality, compared to other multiple layer glass panels comprising non-embossed polymer interlayer sheets having random patterns or polymer interlayer sheets having regular embossed patterns. In an embodiment, the embossing roller(s) has a surface comprising blasted voids having a diameter of less than or equal to 0.02 inches, of less than or equal to 0.01 inches, of from about 0.001 to about 0.02 inches, or of from 0.001 to about 0.01 inches, and a depth of up to about 200 µm, or up to about 150 µm, or up to about 100 µm, or greater than about 1 µm, or greater than about 5 µm, or greater than about 10 µm, or between about 1 and about 200 µm, or between about 5 and about 150 µm, or between about 10 and about 100 µm.

In an embodiment, the embossed polymer sheet is embossed when the polymer sheet is a polymer melt sheet, right out of the die. In another embodiment, the embossed polymer sheet is embossed after cooling and reheating. In an embodiment, the embossed polymer sheet has an initial sheet surface (that is, the surface of the sheet, if measured or capable of being measured before embossing) of less than about 20 µm, or less than about 10 µm, or less than about 5 µm, or less than about 4.0 µm. When the initial sheet surface roughness is low or there is little to no surface roughness pattern, the surface of the initial sheet will not contribute significantly to optical defects, such as mottle. Stated differently, if the initial polymer interlayer sheet surface, prior to embossing, has a high roughness value, then the resultant surface pattern on the embossed polymer interlayer sheet will have contributions from both the initial surface and the embossed surface patterns. It is desirable to have the surface pattern created solely or mostly from the embossing roller(s). If the embossed polymer sheet is embossed in a separate step after cooling, such as described earlier in reference to FIG. 1 or FIG. 2, the initial sheet surface may be higher in order to have a final surface in an acceptable range since the retention of the embossed surface in this process is lower than the retention of the embossed surface when embossing a polymer melt sheet just after the die.

An important parameter used to characterize the sheet and which will be measured is mottle. Mottle refers to an objectionable visual defect that manifests itself as graininess or texture in a laminated multiple layer polymer interlayer, whether or not the surface area of the polymer interlayer is embossed. Generally, based on the maximum acceptable level of mottle determined from customer feedback, the commercially acceptable mottle level is about 2.5 or lower, as measured by the Clear Mottle Analyzer (CMA). The lower the mottle (or closer to a value of 1), the better the optical clarity (more aesthetically pleasing) of the panel or interlayer sheet is.

Mottle may be measured in the following manner. First, a multiple layer panel or multiple layer polymer interlayer is held up between (generally, half way between) a light source and a white background or screen. Generally, the lighting apparatus will be a uniformly diverging light source, such as a xenon arc lamp. The light passes through the test sheet and is then projected onto a screen producing what is commonly known as a shadowgraph. Generally, as the uniformly diverging light source passes through the test sheet, the direction of the light changes as it passes through layers with different refractive indices. The direction of the light changes according to the ratio of refractive indices and the angle of the incoming light relative to the plane of the interface. If the interface plane varies due to surface non-uniformities, the angle of the refracted light will vary accordingly. The non-uniformly refracted light leads to an interference pattern resulting in a projected shadowgraph image with light and dark spots. Traditionally, the mottle of a given multiple layer test panel was assessed by a side-by-side comparison of the shadowgraph projections for the test laminate with a set of shadowgraph projections for a set of laminates having standard mottle values on a mottle scale, from 1 to 4 that designates the degree of mottle for a particular sample, where 1 represents low mottle and 4 represents high mottle. In the traditional system, a test panel was classified as having the mottle value of the standard laminate shadowgraph to which the test panel shadowgraph best corresponded.

Notably, this application contemplates both the traditional methods of measuring and determining mottle and the new processes and methods for measuring mottle on the CMA scale disclosed in Hurlbut, Patent Publication No. US2012/0133764A1, the entire disclosure of which is incorporated herein by reference.

While any method known to one of ordinary skill in the art is contemplated for the embossing step, embossing the polymer melt sheet just after the extrusion die is one of the preferred method of embossing used by the disclosed methods to continuously emboss a polymer melt sheet. The embossing may be done via a single set of two embossing rollers if desired. Embossing the polymer melt sheet after it exits the die provides for a more permanent surface on the sheet than later embossing after the sheet has been cooled and reheated.

In some embossing methods, the polymer melt sheet is fed through embossing rollers immediately after the polymer melt sheet leaves the extruder die; there is no intervening cooling step or meaningful opportunity for the polymer melt sheet to cool in any substantial manner to set and form a polymer interlayer sheet. The embossing rollers have a raised and depressed pattern on their surfaces which form an embossed surface pattern that is the negative imprint of the pattern on the rollers (i.e., the raised portions of the embossed rollers form the depressed portions of the polymer interlayer and visa-versa). The embossing is imparted to the polymer melt sheet by the raised and depressed portions of the embossing rollers as the polymer melt sheet is fed through the embossing rollers. As the polymer melt sheet passes through embossing rollers, the force of the embossing rollers on the polymer melt sheet causes the molten polymer melt to flow into the raised and depressed portions of the rollers resulting in an embossing on the surface of the polymer melt sheet.

Upon exiting the embossing rollers, the embossed polymer melt sheet is comprised of a polymer melt sheet with at least one embossed surface imparted to it by the rollers which is substantially retained by the polymer melt sheet. Substantial retention of the embossing pattern as that term is utilized in this application means retention of most, if not all, of the embossed pattern as it is initially imprinted onto the surface. In some embodiments, the polymer melt sheet will be embossed on only one side. In other embodiments, the polymer melt sheet will be embossed on both sides.

Referring to FIG. 2, after the polymer melt sheet leaves the embossing rollers, in a next step, the embossed polymer melt sheet may be cooled by a cooling device to form a polymer interlayer sheet. Cooling devices that could be used include, but are not limited to, spray jets, fans, cooling baths, cooling rollers or any other cooling apparatus known to those of skill in the art. After the cooling step, it is contemplated in certain embodiments that the polymer interlayer sheets produced by the present methods will be subjected to the final finishing and quality control steps for polymer interlayer manufacturing known to those of skill in the art. In some embodiments, the polymer interlayer sheet will be used in laminated glass panels or other applications.

Depending on the embossing rollers and patterns utilized, an almost endless variety of different patterns could be imparted to the polymer melt sheet in the disclosed methods. The embossing pattern on the rollers could be the same (resulting in the same embossed pattern on both sides of the polymer interlayer) or different (resulting in different embossed patterns on both sides of the polymer interlayer). The width and diameter of the embossing rollers utilized can vary depending upon the sheet width, material thickness, pattern depth, material tensile strength and hardness desired for the end product embossed polymer interlayer sheet. In some embossing processes, engraved steel embossing rollers may be used, but this is in no way limiting. Rather, it is contemplated that the embossing rollers may be formed from any suitable material known in the art to create embossing rollers. In addition, any method or system for heating embossing rollers to a temperature within the embossing roller temperature range defined for the present systems is contemplated.

In one embodiment, the Rz, or surface roughness, of the embossing rollers is within the range of about 20 to 200 microns, or 20 to 100 microns, although the Rz may be higher or lower in other embodiments if desired for the specific process conditions and final polymer interlayer sheet properties. The resultant polymer interlayer surface roughness, Rz, is generally less than or equal to the Rz of the embossing rollers used to emboss the surface. In one embodiment, the final embossed surface roughness, Rz, of the surface of the resultant polymer interlayer will be within the range of about 20 to 40 microns, and the Sz will be in the range of about 1 to about 85 microns, or about 5 to about 50 microns, or about 10 to about 30 microns, or about 10 to about 25 microns, or greater than about 1 micron, or greater than about 5 microns, or greater than about 10 microns, or less than about 85 microns, or less than about 50 microns, or less than about 30 microns, or less than about 25 microns. Generally, the amount of direct replication of the embossment pattern from each embossing roller to the corresponding polymer interlayer is determined by the temperature of the respective roller and manipulation of either the gap between the rollers or the force applied to the rollers (i.e., one can manipulate the gap between the rollers to yield a certain force applied to the polymer melt sheet by the rollers or one can manipulate the force applied to the rollers to maintain a certain gap between the rollers and force on the polymer melt sheet). For sheeting die processes, it is contemplated that surface roughness of the polymer melt sheet exiting the extrusion die immediately prior to embossing will have an Rz value of 0 to 80 microns, and as previously discussed, an Sz value of less than about 20 microns, or less than about 10 microns, or less than about 5 microns, or less than about 4 microns.

Generally, a random, semi-isotropic pattern created by processes known to one of ordinary skill in the art is contemplated for the embossed surface of the polymer interlayer sheets. The pattern on the embossing rollers can be varied and tailored for the specific application in order to achieve the optimal deairing properties and to diminish mottle. For example, the pattern can have higher peaks, wider peaks, more peaks, and the like. The semi-isotropic pattern has a surface texture ratio, Str, in the range of 0.1 to 0.99, or at least 0.1, or less than 0.99, or any value in between. Additionally, the pattern can be varied for other types of de-airing processes than the cold roll nip process, and different Str values may be appropriate.

In embodiments of the disclosed methods in which a multi-layer polymer melt is embossed, embossing can be imparted to one or both of the polymer layers on the surfaces of the multi-layer polymer melt. In this embodiment, embossing can be imparted to the surfaces of the multi-layer polymer melt without substantially affecting the polymer interlayers sandwiched therebetween.

The invention also includes the following Embodiments 1 to 15, as set forth below.

Embodiment 1 discloses an embossed polymer interlayer sheet comprising: a first side; a second side opposing the first side; and an embossed surface on at least one of the sides, wherein the embossed polymer interlayer sheet has a high frequency semi-isotropic surface having a surface texture ratio, Str, (as measured per ISO 25178) of between 0.1 and 0.99.

Embodiment 2 discloses an embossed polymer interlayer sheet comprising: a first side; a second side opposing the first side; and an embossed surface on at least one of the sides, wherein the embossed polymer interlayer sheet has a semi-isotropic surface having a surface texture ratio, Str, (as measured per ISO 25178) of between 0.1 and 0.99 and wherein the embossed polymer interlayer sheet has at least 50 roughness peaks per centimeter (R PC, as measured per ASME B46.1 [1985]).

Embodiment 3 discloses the embossed polymer interlayer sheet of embodiment 2, wherein the Str value (as measured per ISO 25178) is between 0.1 and 0.99.

Embodiment 4 discloses an embossed polymer interlayer sheet comprising: a first side; a second side opposing the first side; and an embossed surface on at least one of the sides, wherein the embossed polymer interlayer sheet has a high frequency semi-isotropic surface having at least 50 roughness peaks per centimeter (R PC, as measured per ASME B46.1 [1985]), and wherein the embossed polymer interlayer sheet has uniform de-airing and an average light transmission of at least 70% when de-aired using a cold nip roll process.

Embodiment 5 discloses an embossed polymer interlayer sheet comprising: a first side; a second side opposing the first side; and an embossed surface on at least one of the sides, wherein the embossed polymer interlayer sheet has a semi-isotropic surface having a surface texture ratio, Str, (as measured per ISO 25178) of between 0.1 and 0.99, wherein the embossed polymer interlayer sheet has a mottle value of less than or equal to 2.5 (as measured by a Clear Mottle Analyzer [CMA]), and wherein the embossed polymer interlayer sheet has uniform de-airing and an average light transmission of at least 70% when de-aired using a cold nip roll process.

Embodiment 6 discloses the embossed polymer interlayer sheet of any of embodiments 1 to 5, wherein the Str value (as measured per ISO 25178) is between 0.2 and 0.99.

Embodiment 7 discloses the embossed polymer interlayer sheet of any of embodiments 1 to 6, wherein the Str value (as measured per ISO 25178) is greater than 0.5

Embodiment 8 discloses the embossed polymer interlayer sheet of any of embodiments 1 or 5, wherein the embossed polymer interlayer sheet has at least 50 roughness peaks per centimeter (R PC, as measured per ASME B46.1 [1985]).

Embodiment 9 discloses the embossed polymer interlayer sheet of any of embodiments 1 to 8, wherein the embossed polymer interlayer sheet has at least 85 roughness peaks per centimeter (R PC, as measured per ASME B46.1 [1985]).

Embodiment 10 discloses the embossed polymer interlayer sheet of any of embodiments 1 to 9, wherein the embossed polymer interlayer sheet has at least 100 roughness peaks per centimeter (R PC, as measured per ASME B46.1 [1985]).

Embodiment 11 discloses the embossed polymer interlayer sheet of any of embodiments 1 to 10, wherein the embossed polymer interlayer sheet has a peak height distribution kurtosis, Sku, of greater than 3.0 (as measured per ISO 25178).

Embodiment 12 discloses the embossed polymer interlayer sheet of any of embodiments 1 to 3, wherein the embossed polymer interlayer sheet has uniform de-airing and an average light transmission of at least 70% when de-aired using a cold nip roll process Embodiment 13 discloses the embossed polymer interlayer sheet of any of embodiments 1 to 12, wherein the polymer is polyvinyl butyral.

Embodiment 14 discloses the embossed polymer interlayer sheet of any of embodiments 1 to 4, wherein the embossed polymer interlayer sheet has a mottle value of less than or equal to 2.5 (as measured by a Clear Mottle Analyzer [CMA]).

Embodiment 15 discloses the embossed polymer interlayer sheet of any of embodiments 1 to 14, wherein the embossed polymer interlayer sheet has a surface roughness, Sz, of from about 5 to about 50 microns.

EXAMPLES

The improvements of the presently disclosed polymer interlayers and methods for embossing a polymer interlayer (designated as the "Disclosed Interlayers") can be most readily appreciated by a comparison to the Conventional Interlayers, as well as by a comparison to two comparative PVB samples having random surface patterns ("Comparative Interlayers") produced by different embossing rollers that were manufactures using larger grit sizes. In the following examples, exemplary Disclosed Interlayers produced by the processes described herein were tested for, surface characteristics and topography as well as mottle and de-airing uniformity (described in more detail below) and compared to Conventional Interlayers. These examples demonstrate the balance of properties including improved cold nip roll de-airing uniformity and improved mottle, along with other advantageous qualities, of the embossed surfaces of the Disclosed Interlayers.

In order to gain a broader understanding of the processes for producing polymer interlayers, two processes will be briefly described. As seen in FIGS. 1 and 2, in the first process, after the polymer melt sheet leaves the extrusion die, it is cooled to form a polymer interlayer sheet in a cooling step. Generally, the entirety of the polymer melt sheet is cooled in order to set the polymer melt sheet into a polymer interlayer sheet. After the cooling step, the polymer interlayer sheet is fed into an embossing station comprising an embossing roll and a rubber-faced backup roll. During or prior to embossing, the surface of the polymer interlayer sheet is reheated generally by the heated embossing roll. The embossing roller is heated to a desired temperature, for example, about 121° C. to about 232° C. by the presence of an appropriate heating mechanism beneath the embossing surface. The heated embossing roller then heats the surface, not the entirety, of the polymer interlayer sheet to a desired temperature, for example, about 121° C. to about 232° C. In this process, embossing two sides of the polymer interlayer sheet can be accomplished by running the polymer interlayer sheet between a second embossing roller/rubber roller set subsequently or by passing the polymer interlayer sheet through the same embossing roller/rubber roller set a second time. Conventional Interlayer B1 was produced by this type of process. In a second process, the polymer melt is embossed just after the polymer melt exits the die without cooling of the polymer melt, where the polymer melt sheet temperature is very similar to the polymer melt temperature as it exits the die, and then the polymer melt sheet is cooled to form a polymer interlayer sheet, as previously described. Disclosed Interlayers A1, A2 and A3, Comparative Interlayers C1 and C2, as well as Conventional Interlayer B2, were produced using this process. Conventional Interlayer B3 is a non-embossed interlayer sample (the surface is produced by melt fracture and is not embossed).

The results of the following examples demonstrate the following advantages of the Disclosed Interlayers over the Conventional Interlayers and Comparative Interlayers: improved (less) mottle in combination with improved (better) cold nip roll de-airing uniformity.

In each of the examples, mottle of the samples was measured in a multiple layer glass panel sample (or laminate). De-airing uniformity of the samples was also determined. De-airing uniformity is a test that measures how well the interlayer de-airs in a cold nip roll process. As used herein, cold nip roll process means a nip roll process where the glass temperature is about 45 to 60° C. The nip roll de-airing uniformity is both a qualitative and a quantitative test. The qualitative test is a visual measure of how uniform the de-airing is, that is, how well the nip rolls remove air from the laminate. If there are large "cloudy" or opaque areas as well as some clear or transparent areas in the laminate, then the de-air uniformity is Not Uniform. In the quantitative test, the light transmission (%) of the laminate is measured at a predetermined number of points on the laminate and averaged to determine the de-air uniformity of the sample. In the quantitative test, as used herein, a polymer interlayer sheet has good or "Uniform" de-airing uniformity if the de-airing of the sample was uniform across the sample, and the average measured light transmission of the laminate was greater than or equal to 70%, or greater than or equal to 75%, and the maximum difference between the measurements is less than 20, or less than 15, or less than 10, or less than 5%. As used herein, a polymer interlayer sheet where the de-airing uniformity is no good or "Not Uniform" is one where the de-airing of the sample was not uniform across the sample, and the transmission of the laminate was less than 70% and/or the difference between the measurements was greater than 20%. A large difference between the measurements (which means a higher standard deviation) generally is a sign that the de-airing quality is not uniform or is very variable. It is important to note that when measuring the light transmission on the laminate, both "cloudy" or opaque regions (if any) and clear or transparent regions must be measured and averaged, or the numbers will not be representative of the de-airing uniformity or will not measure true uniformity or non-uniformity. The type of surface on the sheet was also identified as either Regular or Random.

The embossing rollers used to emboss the Disclosed Interlayers samples were made by a controlled, blasted surface, using processes known to one skilled in the art. The embossing roller for Disclosed Interlayers A1, A2 and A3 were made using a narrow distribution and smaller particle size material, and the embossing rollers for Comparative Interlayers C1 and C2 were made using larger particle size materials. The range of particle sizes for the embossing roller used to make Comparative Interlayer C1 was different than the range of particle sizes for the embossing roller used to make Comparative Interlayer C2. The penetration of the particles into the roller was controlled to make a certain size void in the surface of the roller, and the pressures used while embossing were manipulated to provide a surface roughness in the ranges described. It will be readily understood by one skilled in the art that process conditions could be modified to provide different surface roughness characteristics as desired. One skilled in the art would recognize that any particle type and size distribution known in the art for blasting a surface may be used, and the skilled artisan will select an appropriate particle type or types depending on the desired outcome and roller materials. Examples of suitable particles include, but are not limited to, steel, aluminum oxide, tungsten carbide, and the like.

Figure 5:
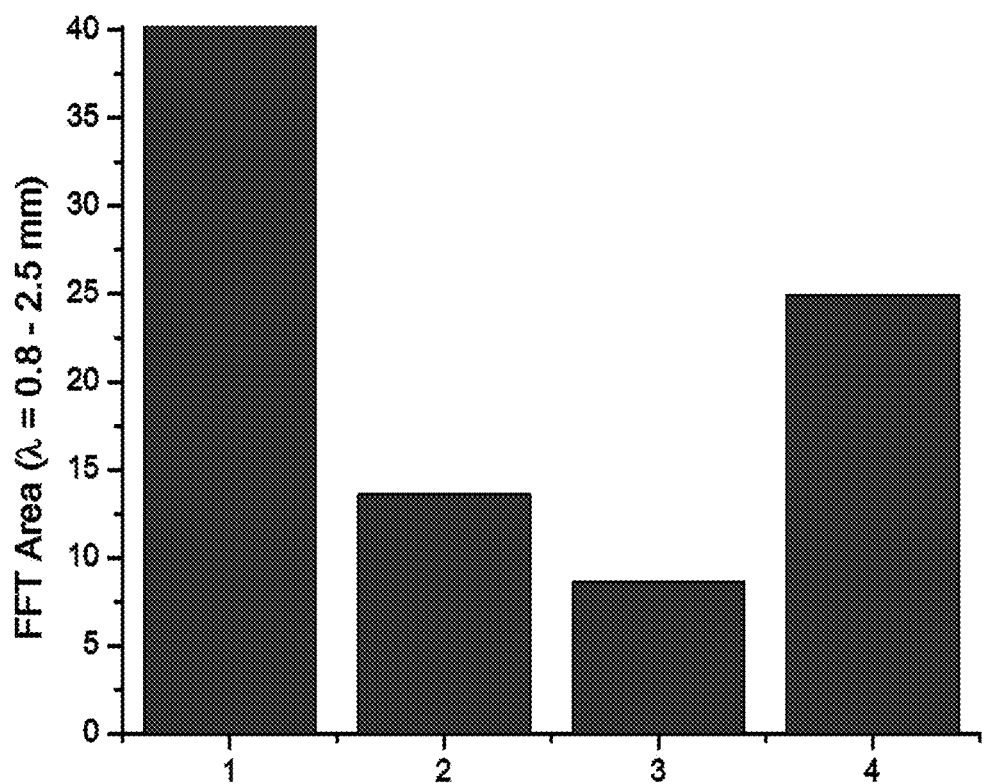
FIG. 5 provides a chart showing the Fast Fourier Transform Amplitude Area of the roughness profile of four samples.

FIG. 5 shows the Fast Fourier Transform (FFT) Amplitude Area of the roughness profile of four samples. Sample 1 is an example of a polymer interlayer sheet having a melt fracture surface (a random pattern created by melt fracture), similar to Conventional Interlayer B3, Sample 2 is an example of an embossed polymer interlayer sheet having a random pattern made in the process used to make Disclosed Interlayer A1, Sample 3 is an example of an embossed polymer interlayer sheet having a random pattern made in the process used to make Disclosed Interlayers A2 and A3, and Sample 4 is an example of an embossed polymer interlayer sheet having a regular pattern made in a process similar to Conventional Interlayer B1. As shown in FIG. 5, the FFT amplitude area of the roughness profile of the Disclosed Interlayers is much lower than that of the non-embossed (melt fracture) sample or the sample with the regular pattern. Samples with lower (better) mottle had a lower portion of the area greater than 0.8 mm than samples with higher (worse) mottle. Many different software programs can produce FFT and are known to one skilled in the art. To produce the chart in FIG. 5, standard two-dimensional surface roughness traces (as previously described) were used, using Origin 8.0 software.

Samples of three different Conventional Interlayers (B1, B2 and B3), three different Disclosed Interlayers (A1, A2 and A3), and two Comparative Interlayers (C1 and C2), were measured for various surface parameters and for de-airing uniformity in a cold nip roll de-airing process. All of the Disclosed Interlayers had a Roughness Peak Count (R PC) of greater than 50. The samples are as described below in Table 1, and results are in Tables 1, 2 and 3.

Example 1

TABLE 1

| Property/ Sample | B1 Conventional Interlayer1 | B2 Conventional Interlayer 2 | B3 Conventional Interlayer 3 | A1 Disclosed Interlayer 1 | A2 Disclosed Interlayer 2 | A3 Disclosed Interlayer 3 | C1 Comparative Interlayer 1 | C2 Comparative Interlayer 2 |
|---|---|---|---|---|---|---|---|---|
| Embossed/ Not Embossed | Embossed | Embossed | Not Embossed | Embossed | Embossed | Embossed | Embossed | Embossed |
| Random or Regular | Regular | Regular | Random | Random | Random | Random | Random | Random |
| Ssk | 0.113 | 0.202 | 0.428 | 1.85 | −0.037 | −0.177 | −0.875 | −0.59 |
| Sku | 1.8 | 2.58 | 3.25 | 8.58 | 4.01 | 3.81 | 6.35 | 3.98 |
| Sz | 26.5 | 21.1 | 12.7 | 29.4 | 16.2 | 18.2 | 20.9 | 20.9 |
| Str | 0.041 | 0.056 | 0.662 | 0.277 | 0.728 | 0.705 | 0.448 | 0.399 |
| Rpc | 28-36 | 32-36 | 20-32 | 58-75 | 65-85 | 90-113 | Not Measured | Not Measured |

TABLE 2

| Property/ Sample | B1 Conventional Interlayer1 | B2 Conventional Interlayer 2 | B3 Conventional Interlayer 3 | A1 Disclosed Interlayer 1 | A2 Disclosed Interlayer 2 | A3 Disclosed Interlayer 3 | C1 Comparative Interlayer 1 | C2 Comparative Interlayer 2 |
|---|---|---|---|---|---|---|---|---|
| Embossed/ Not Embossed | Embossed | Embossed | Not Embossed | Embossed | Embossed | Embossed | Embossed | Embossed |
| Random or Regular | Regular | Regular | Random | Random | Random | Random | Random | Random |
| Actual Mottle | 3.0 | 1.0 | >2.5 | 1.5 | 1.0 | 1.0 | 5+ ** | 5+ ** |
| De-air Uniformity | Not Uniform | Not Uniform | Uniform | Uniform | Uniform | Uniform | Not tested high mottle | Not tested high mottle |

** High mottle, very wavy

TABLE 3

| Property | B3 Conventional Interlayer 3 | B2 Conventional Interlayer 2 | A1 Disclosed Interlayer 1 | C1 Comparative Interlayer | C2 Comparative Interlayer |
|---|---|---|---|---|---|
| Average Transmission (%) | 78 | 83 | 77 | 78 | 59 |
| Std. Dev. | 1.717 | 2.385 | 1.362 | 5.066 | 6.669 |
| Max. Difference | 4.7 | 6.1 | 4.1 | 33.9 | 19.5 |
| De-air Uniformity | Uniform | Not Uniform | Uniform | Not Uniform | Not Uniform |
| De-air Ranking* | 1 | 3 | 2 | 3 | 5 |

*The samples were ranked visually where 1 is the best or most uniform de-air quality, and 5 is the worst or least uniform de-air quality.

Example 1 demonstrates that the Disclosed Interlayers, A1, A2 and A3, as well as the Comparative Interlayers C1 and C2, have a texture aspect ratio, Str, in the desired range, where Str is between 0.1 and 0.9, as shown in Table 1. The Disclosed Interlayers, which have Str values in the ranges of 0.277 to 0.728, have high frequency, semi-isotropic, random surfaces. The Conventional Interlayers all have Str values of less than 0.1. The Comparative Interlayers have Str values in the desired range, but the mottle and/or de-airing uniformity are not acceptable. As shown in Table 2, the Disclosed Interlayers also have good or excellent mottle (less than or equal to 2.5).

Table 3 shows the de-air uniformity for several samples, including Disclosed Interlayer A1, Conventional Interlayers B2 and B3, and Comparative Interlayers C1 and C2. The samples were measured for light transmission (%) using an adhesion photometer (Tokyo Denshoku #S-904356). Each laminate is tested multiple times at dispersed locations throughout the laminate, and the individual results are averaged to give the light transmission. On each sample tested here, six measurements were made (three on each long side of a 3 foot by 1 foot glass panel), and the average, standard deviation and maximum difference of the measurements calculated, as shown in Table 3. The measurements were made at a glass temperature of about 47 to 48° C. The data in Table 3 shows that the de-air uniformity of the Disclosed Interlayer is good, and better than the Comparative Interlayer samples.

Additional samples of the Disclosed Interlayers, which were produced on a commercial scale production line trial using an embossing roll having a surface roughness of 75 to 100 μm (as discussed above), were tested for mottle and de-air uniformity. One sample, Disclosed Interlayer 4, also had R PC measured. All samples were embossed using a random embossing pattern. The results of the tests are shown in Table 4.

TABLE 4

| Sample | Property | | |
|---|---|---|---|
| | Actual Mottle | De-air Uniformity | R PC |
| A4 Disclosed Interlayer 4 | 1.5 | Uniform | 35-43 |
| A5 Disclosed Interlayer 5 | 1.5 | Uniform | Not Measured |
| A6 Disclosed Interlayer 6 | 1.0 | Uniform | Not Measured |
| A7 Disclosed Interlayer 7 | 1.0 | Uniform | Not Measured |
| A8 Disclosed Interlayer 8 | 0.5 | Not Measured | Not Measured |
| A9 Disclosed Interlayer 9 | 0.5 | Not Measured | Not Measured |
| A10 Disclosed Interlayer 10 | 0.8 | Not Measured | Not Measured |
| A11 Disclosed Interlayer 11 | 0.9 | Not Measured | Not Measured |
| A12 Disclosed Interlayer 12 | 1.3 | Not Measured | Not Measured |
| A13 Disclosed Interlayer 13 | 1.2 | Not Measured | Not Measured |

Table 4 further confirms that an improved, embossed interlayer having a random embossing pattern can be produced where the interlayer has uniform de-airing and low mottle.

The Disclosed Interlayers have a better balance of performance properties than any of the Conventional Interlayers or the Comparative Interlayers. The Comparative Interlayers, while having high frequency, semi-isotropic random surfaces, have high mottle and/or poor de-airing uniformity.

In conclusion, the disclosed polymer interlayer sheet having a random embossed surface has numerous advantages over other polymer interlayer sheets previously shown in the art. The disclosed polymer interlayer sheet has an improved balance of properties, including optical quality and de-airing performance, which allows for improved utilization of the polymer interlayer sheets in multiple layer glass panels and the lamination processes used to produce the panels.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

What is claimed is:

1. An embossed polymer interlayer sheet comprising: a first side; a second side opposing the first side; and an embossed surface on at least one of the sides, wherein the embossed polymer interlayer sheet has a high frequency semi-isotropic surface having a surface texture ratio, Str, (as measured per ISO 25178) of between 0.2 and 0.99, wherein the embossed polymer interlayer sheet has a peak height distribution kurtosis, Sku, of greater than 3.0 (as measured per ISO 25178), and wherein the polymer is polyvinyl butyral.

2. The embossed polymer interlayer sheet of claim 1, wherein the Str value (as measured per ISO 25178) is greater than 0.5.

3. The embossed polymer interlayer sheet of claim 1, wherein the embossed polymer interlayer sheet has at least 50 roughness peaks per centimeter (R PC, as measured per ASME B46.1 (1985)).

4. The embossed polymer interlayer sheet of claim 1, wherein the embossed polymer interlayer sheet has at least 85 roughness peaks per centimeter (R PC, as measured per ASME B46.1 (1985)).

5. The embossed polymer interlayer sheet of claim 1, wherein the embossed polymer interlayer sheet has at least 100 roughness peaks per centimeter (R PC, as measured per ASME B46.1 (1985)).

6. The embossed polymer interlayer sheet of claim 1, wherein the embossed polymer interlayer sheet has uniform de-airing and an average light transmission of at least 70% when placed between two glass substrates and de-aired using a cold nip roll process.

7. The embossed polymer interlayer sheet of claim 1, wherein the embossed polymer interlayer sheet has a mottle value of less than or equal to 2.5 (as measured by a Clear Mottle Analyzer (CMA)) when laminated between two glass substrates.

8. The embossed polymer interlayer sheet of claim 1, wherein the embossed polymer interlayer sheet has a surface roughness, Sz, of from about 5 to about 50 microns.

9. The embossed polymer interlayer sheet of claim 1, wherein the embossed polymer interlayer sheet comprises a multi-layer sheet.

10. The embossed polymer interlayer sheet of claim 1, wherein the Str value (as measured per ISO 25178) is between 0.2 and 0.8.

11. An embossed polymer interlayer sheet comprising: a first side; a second side opposing the first side; and an embossed surface on at least one of the sides, wherein the embossed polymer interlayer sheet has a semi-isotropic surface having a surface texture ratio, Str, (as measured per ISO 25178) of between 0.2 and 0.99 and wherein the embossed polymer interlayer sheet has at least 50 roughness peaks per centimeter (R PC, as measured per ASME B46.1 (1985)), wherein the embossed polymer interlayer sheet has a peak height distribution kurtosis, Sku, of greater than 3.0 (as measured per ISO 25178), and wherein the polymer is polyvinyl butyral.

12. The embossed polymer interlayer sheet of claim 11, wherein the embossed polymer interlayer sheet has uniform de-airing and an average light transmission of at least 70% when placed between two glass substrates and de-aired using a cold nip roll process.

13. The embossed polymer interlayer sheet of claim 11, wherein the embossed polymer interlayer sheet has a mottle value of less than or equal to 2.5 when laminated between two glass substrates (as measured by a Clear Mottle Analyzer (CMA)).

14. The embossed polymer interlayer sheet of claim 11, wherein the embossed polymer interlayer sheet comprises a multi-layer sheet.

15. An embossed polymer interlayer sheet comprising: a first side; a second side opposing the first side; and an embossed surface on at least one of the sides, wherein the embossed polymer interlayer sheet has a high frequency semi-isotropic surface having at least 50 roughness peaks per centimeter (R PC, as measured per ASME B46.1 (1985)), and wherein the embossed polymer interlayer sheet has uniform de-airing and an average light transmission of at least 70% when placed between two glass substrates and de-aired using a cold nip roll process, wherein the embossed polymer interlayer sheet has a peak height distribution kurtosis, Sku, of greater than 3.0 (as measured per ISO 25178), and wherein the polymer is polyvinyl butyral.

16. The embossed polymer interlayer sheet of claim 15, wherein the Str value (as measured per ISO 25178) is between 0.2 and 0.99.

17. The embossed polymer interlayer sheet of claim 15, wherein the embossed polymer interlayer sheet has a mottle value of less than or equal to 2.5 when laminated between two glass substrates (as measured by a Clear Mottle Analyzer (CMA)).

18. The embossed polymer interlayer sheet of claim 15, wherein the embossed polymer interlayer sheet comprises a multi-layer sheet.

* * * * *